Patented Feb. 10, 1925.

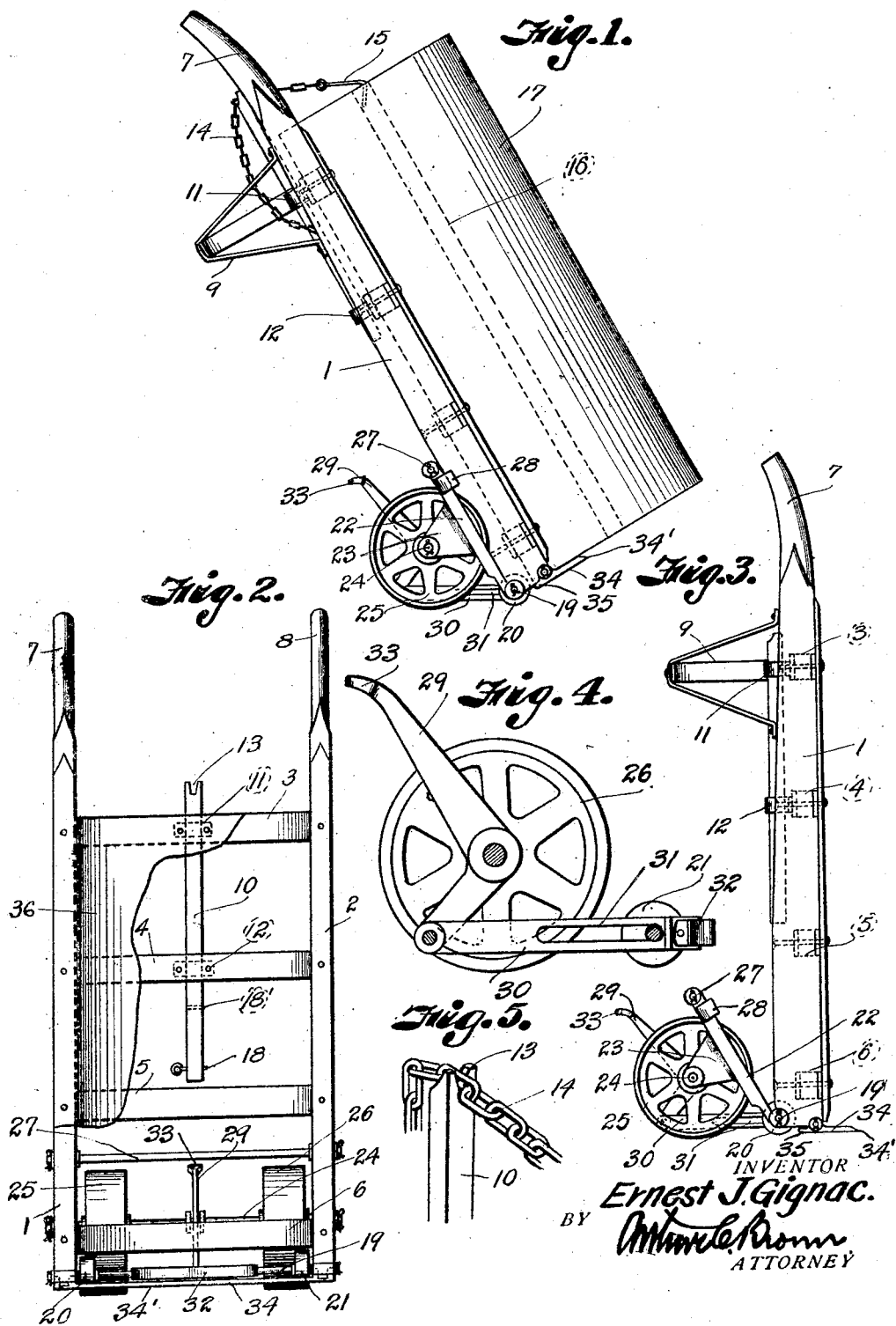

1,525,444

UNITED STATES PATENT OFFICE.

ERNEST J. GIGNAC, OF KANSAS CITY, MISSOURI.

TRUCK.

Application filed July 30, 1923. Serial No. 654,715.

*To all whom it may concern:*

Be it known that I, ERNEST J. GIGNAC, a citizen of the United States, residing at Kansas City, in the county of Jackson and State of Missouri, have invented certain new and useful Improvements in Trucks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to hand trucks, and it is particularly designed for the purpose of handling large paper rolls. The primary object of the invention is to provide means for facilitating the handling of large paper rolls to enable the roll to be placed upon the truck without the liability of damaging the edge of the roll either in placing it upon the truck or removing it. It is also one of the objects of the invention to support the roll wholly upon wheels so that the weight of the roll need not be carried by the operator. To this end, I have provided a truck with four wheels, which are adapted to carry the entire load. I have also provided a novel form of ejector, by means of which the truck may be released from engagement with the roll in a convenient manner, and means is provided for holding the roll on the truck frame during transportation.

The other objects and advantages of the invention will be apparent by reference to the following description in connection with the accompanying drawings, in which:

Figure 1 is a side, elevational view of a truck constructed in accordance with my invention and supporting a paper roll;

Figure 2 is a front view of the truck;

Figure 3 is a side, elevational view of the truck in position to receive the roll;

Figure 4 is an enlarged view of the wheeled base for supporting the frame; and

Figure 5 is a fragmentary view of the roll-holding means.

The illustrated embodiment of my invention consists of a truck frame, comprising side bars, 1 and 2, connected by curved cross bars 3, 4, 5, and 6, the cross bars constituting a cradle to receive the paper roll. The side bars, 1 and 2, are provided with handles, 7 and 8, and appropriately secured to the truck frame are feet, 9, of appropriate construction. The cross bars, 3 and 4, carry a longitudinally adjustable bar, 10 slidably mounted in the clips, 11 and 12, the upper end of the bar being bifurcated, as at 13, to receive the links of a chain, 14, to fasten to the truck frame and having a hook, 15, to engage in the core opening, 16, of the paper roll, 17, to hold it in place. The bar 10, can be held in position through the medium of the cross pin, 18, engaging the openings, 18', so that the bar can be held in an elevated or lowered position for different sizes of rolls. Extending transversely of the truck frame and in the lower rear corner thereof, is mounted an axle, 19, carrying small truck wheels, 20 and 21, and pivoted on the axle are two parallel bars, 22, (one being shown) the bars, 22, having journal brackets, 23, in which are mounted an axle, 24, carry two wheels, 25 and 26, in the rear of the wheels, 20 and 21, the large wheel frame consisting of the two parallel bars, 22, the journal members 23, and the cross bar, 27, for swinging about the axis of the axle of shaft, 19, the bar, 22, having outwardly extending lips, 28, to lie against the side bars, 1 and 2, when the load is supported ready for transportation. Pivoted on the axle 24 is a pedal lever, 29, the pedal lever being in the form of an elbow and being pivoted at its lower end to a link, 30, which has elongated slot, 31, therein through which the axle, 19, extends, the forward end of the bar, 30, carrying a pivoted ejector bar, 32, adapted to bear against the rolls so that when pressure is applied to the upper end, 33, of the elbow lever, 29, the truck will be pushed away from the roll or other article comprising the load. Pivoted to the forward lower corner of the truck frame is a supporting bar, 34, having a relatively sharp toe, 34', and a heel, 35, the heel being adapted to bear against the lower end of the truck frame so that the truck frame constitutes a stop to hold the member, 34, in horizontal position or at right angles to the truck frame so as to support the load.

When it is desired to receive the roll upon the truck, the truck is pushed up into close proximity to the roll, the roll is tilted forwardly, and the toe, 34', is slid under the roll so that the roll will rest upon it. The bars, 22, journal brackets, 23, and wheels, 25 and 26, constitute a sub-frame for the main frame of the truck so that the wheels, 25 and 26, co-operate with the wheels, 20 and 21, to form a sub-truck upon which the main frame, consisting of the bars, 1 and 2, and the cross bars is supported. Therefore, when the toe, 34', is pushed under the paper roll, it will be necessary only to tilt the main truck frame back at an angle of about forty-five degrees, or slightly less, to allow the main frame to rest on the bars 22, as clearly shown in Figure 1. Then the entire load will be supported by the wheels 20, 21, and the wheels 25, 26. Consequently, the load need not be carried by the operator. It is important that the main frame can be tilted to a vertical position, in order to receive the load, because in that position, the member 34 will be in horizontal position close to the floor, so that it can be slid under the roll without the liability that the toe, 34', may contact with the paper and so tend to mar or tear it. When the main frame of the truck is tilted over to the position shown in Figure 1, the truck can be moved to the desired position to discharge the roll. In order to cause the roll to move over with the main frame, I recommend the use of the adjustable roll-engaging means, consisting of the chain, 14 and the hook 15, to hold the roll in contact with the frame during the tilting operation and during transportation.

When the roll has been carried to the point where it is desired to release it, the main frame will again be tilted to a vertical position. The operator may then press upon the end, 33, of the lever, 29. This will force the link, 30, forward, causing the ejector bar, 32, to press against the roll, and since the ejector bar is curved on an arc approximating the arc of curvature of the roll, it will put a pressure about a portion of the circumference of the roll which will cause the truck to back off from the roll, so that the roll can be discharged in a convenient manner. The bars 3, 4 and 5, support a sheet, 36, to provide a cradle upon which the roll may rest when the frame is in tilted position.

One of the objects of the pivoted shoe is that the load supporting frame can be tilted forward beyond the perpendicular in releasing the load without liability of the toe being tilted downwardly into the floor which might happen if the shoe was rigid with the frame.

I have specifically described in exact terms the preferred construction of my invention, but I do not wish to be limited to the specific details illustrated or described, because changes in form, proportion, and minor details of construction may be made without departing from the spirit of my invention or sacrificing any of its advantages.

What I claim and desire to secure by Letters Patent is:

1. A truck comprising a load supporting frame, a wheeled sub-frame upon which the first frame is pivoted, so that the first frame can swing into a vertical position, an independently movable pivoted blade mounted on the lower end of the first frame and a front edge to slip under the load when the truck is moved into load receiving position, the front end portion of the blade serving to prevent downward longitudinal movement of the load when it is on the truck.

2. A truck comprising a load supporting frame, a wheeled sub-frame upon which the first frame is pivoted, so that the first frame can swing into a vertical position, an independently movable pivoted blade mounted on the lower end of the first frame and a front edge to slip under the load when the truck is moved into load receiving position, the front end portion of the blade serving to prevent downward longitudinal movement of the load when it is on the truck, and an ejector for contact with the load to move it off the blade to discharge the load.

3. In a truck, a load supporting frame and a sub-frame pivoted to it, a front axle for the sub-frame, a rear axle for the sub-frame, wheels on the respective axles and an ejector comprising slotted bars carried by the front axle, a cross bar connecting their front ends and an elbow lever carried by the rear axle and pivotally connected to the slotted bars.

In testimony whereof I affix my signature.

ERNEST J. GIGNAC.